United States Patent [19]

Brailey et al.

[11] Patent Number: 5,679,985
[45] Date of Patent: Oct. 21, 1997

[54] POWER SUPPLY WITH AUTOMATIC RECOVERY SYSTEM

[75] Inventors: Allen Charles Brailey; Kenneth Wayne Cash; Jack Harvey Derenburger, all of Tucson, Ariz.

[73] Assignee: International Business Machines Corporation, Armonk, N.Y.

[21] Appl. No.: 280,404

[22] Filed: Jul. 25, 1994

Related U.S. Application Data

[63] Continuation of Ser. No. 950,626, Sep. 23, 1992, abandoned.

[51] Int. Cl.⁶ .................................................. H02J 9/00
[52] U.S. Cl. ........................... 307/18; 307/23; 307/29; 307/87
[58] Field of Search ........................ 307/18, 23, 29, 307/64–66, 85–87

[56] References Cited

U.S. PATENT DOCUMENTS

| 4,377,000 | 3/1983 | Staab | 371/11 |
|---|---|---|---|
| 4,384,213 | 5/1983 | Bogel | 307/64 |
| 4,514,846 | 4/1985 | Federico et al. | 371/16 |
| 4,589,090 | 5/1986 | Downing et al. | 364/900 |
| 4,611,289 | 9/1986 | Coppola | 371/66 X |
| 4,686,462 | 8/1987 | Prilik | 324/158 |
| 4,757,505 | 7/1988 | Marrington et al. | 371/66 |
| 4,818,891 | 4/1989 | Drinkwater | 307/64 |
| 4,868,832 | 9/1989 | Marrington et al. | 371/66 |
| 4,881,220 | 11/1989 | Uiyomogida et al. | 370/16 |
| 4,912,708 | 3/1990 | Wendt | 371/16.3 |
| 4,997,288 | 3/1991 | Rosenow | 380/2 |
| 5,138,184 | 8/1992 | Keefe | 307/64 |
| 5,142,165 | 8/1992 | Allard et al. | 307/130 |
| 5,148,042 | 9/1992 | Nakazoe | 307/65 |
| 5,175,847 | 12/1992 | Mellott | 395/575 |
| 5,268,850 | 12/1993 | Skoglund | 307/64 X |

FOREIGN PATENT DOCUMENTS

| 57-055736 | 4/1982 | Japan. |
|---|---|---|
| 62-207138 | 9/1987 | Japan. |

*Primary Examiner*—Fritz Fleming
*Attorney, Agent, or Firm*—Benman, Collins & Sawyer

[57] ABSTRACT

A recovery system for a power supply. The inventive system includes a first circuit which detects a reapplication of wall power to the power supply and generates a signal in response thereto after an interruption in the output thereof. A second circuit then automatically reactivates the power supply on receipt of the signal without operator intervention. The invention is particularly well suited for systems having multiple power supplies each operating within an associated power boundary. In this case, a first power supply provides power to a first load and a second power supply provides power to a second load. A control circuit is provided in each load. The control circuit is equipped to receive the signal indicating a reapplication of power to a power supply within another power boundary and automatically reactivate the power supply.

3 Claims, 4 Drawing Sheets

ID=5,679,985

POWER SUPPLY WITH AUTOMATIC RECOVERY SYSTEM

This is a continuation of application Ser. No. 07/950,626, filed Sep. 23, 1992, now abandoned.

BACKGROUND OF THE INVENTION

1. Field of the Invention

The present invention relates to power supplies. More specifically, the present invention relates to fault detection and recovery in power supplies.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Electrical power supplies are subject to shutdown due to an external interruption in the supply of raw power or an internal component failure (within the supply) or a power line disturbance. For certain applications, e.g., disk control for large mainframes, redundant power supplies are used to provide power in the event of a shutdown of a primary power supply. In these redundant systems, each power supply provides power to circuits within a given power boundary. The term power boundary is used in the art to denote those circuits powered by a given power supply. A monitoring unit (typically a microprocessor) within each boundary monitors a line from a power supply across or outside the boundary for a power fault interrupt signal. This signal indicates that the power supply outside the boundary has shut down or is otherwise unable to supply power. In addition, the microprocessor receiving the alert reports the failed component and generates a service call. The monitoring unit will periodically generate the service request call until the condition is cleared.

Typically, line power is ultimately restored and/or a repairman effects the necessary repairs. In any event, it is also typically necessary for a repairman to manually power-up the affected power supply to overcome the inherent safety mechanisms thereof.

After the repair is effected and the failed power supply is powered-up, the failed power supply has to be returned to service. The repairman generally has to signal the reporting microprocessor that the repair has been effected, whereupon the reporting microprocessor then cancels the service request and discontinues service across the boundary. Unfortunately, the manual power-up operation is generally time consuming. In addition, if and when the repairman fails to clear the service call request condition of the nonaffected monitoring unit, a return visit for this sole purpose may be required.

Thus, there has been a need in the art for a system and technique for detecting repair of a failed power supply or the restoration of power thereto and for automatically powering-up the failed power supply without operator intervention.

SUMMARY OF THE INVENTION

The need in the art is addressed by the present invention which provides a recovery system for a power supply. The inventive system includes a first circuit which detects a reapplication of (wall) power to the power supply and generates a signal in response thereto after an interruption in the output of the power supply. A second circuit then automatically reactivates the power supply on receipt of the signal without operator intervention.

The invention is particularly well suited for systems having multiple power supplies each operating within an associated power boundary. In this case, a first power supply provides power to a first load and a second power supply provides power to a second load. A control circuit is provided in each load. Each control circuit is equipped to receive the signal indicating a reapplication of power to a power supply within another power boundary and automatically reactivate the power supply.

In any event, the present invention provides a system and technique for detecting repair of a failed power supply or the restoration of power thereto and for automatically powering-up the shut down power supply without operator intervention.

DESCRIPTION OF THE INVENTION

Illustrative embodiments and exemplary applications will now be described with reference to the accompanying drawings to disclose the advantageous teachings of the present invention.

Figure 1:
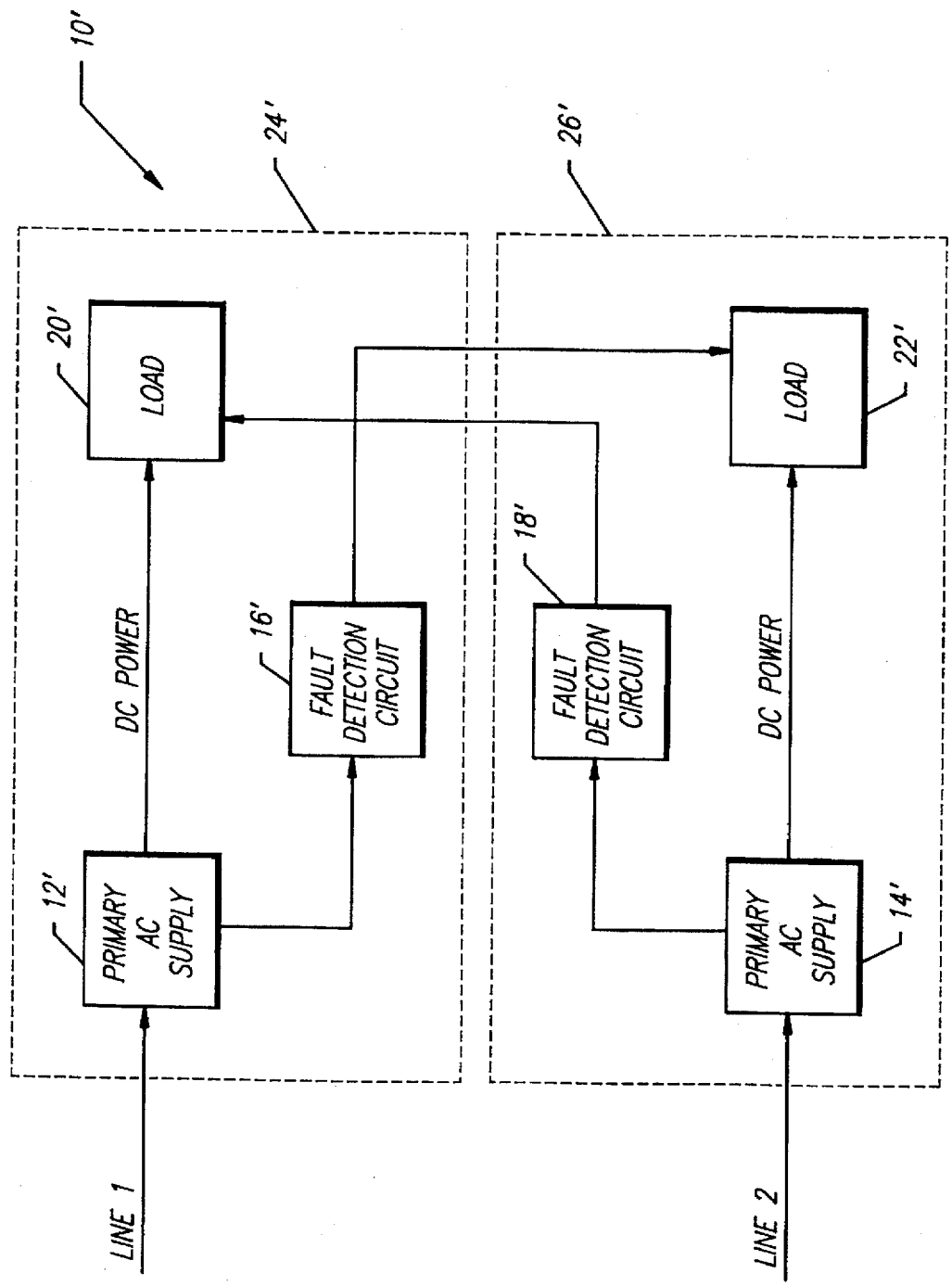
FIG. 1 illustrates a typical conventional system with two primary power supplies and associated fault detection circuits.

FIG. 1 illustrates a typical conventional system 10' with two primary power supplies and associated fault detection circuits 16' and 18' respectively. Each primary power supply 12' and 14' typically provides DC power to an associated load 20' and 22', respectively. The first primary power supply 12' with its associated fault detection circuit 16' and load 20' are disposed within a first power boundary 24'. The second power supply 14' with its associated fault detection circuit 18' and load 22' are disposed within a second power boundary 26'. Each power supply typically receives wall power via a three phase line shown as line 1 and line 2. When wall power is interrupted or one of the power supplies is defective, DC power is interrupted to the associated load and the effected power supply is disabled or shut down by internal relays. The associated fault detection circuit generates an interrupt to a controller (not shown) disposed at the load across the power boundary. The controller receiving the interrupt then generates a service call signal.

When the fault is in the power supply, a repairman is typically dispatched to the site to effect the necessary repairs. On completion of the repairs, the repairman must remember to clear the service call request condition of the nonaffected supply and reactivate the disabled power supply. Unfortunately, the repairman may neglect to reset the service call condition necessitating a costly return visit.

In addition, when the interrupt is generated due to a discontinuation of wall power of a minimal predetermined duration, a visit by a repairman or a system operator is typically required for the sole purpose of reactivating the effected power supply. As mentioned above, this is costly. Thus, there has been a need in the art for an improved power supply capable of automatic recovery in the event of an interruption in wall power.

The present invention addresses the need in the art by providing a recovery system for a power supply. The inventive system includes a first circuit which detects a reapplication of wall power to the power supply and generates a signal in response thereto after an interruption in the output of the power supply. A second circuit then automatically reactivates the power supply on receipt of the signal without operator intervention.

The invention is particularly well suited for systems having multiple power supplies each operating within an associated power boundary. In this case, a first power supply provides power to a first load and a second power supply provides power to a second load. A control circuit is provided in each load. The control circuit is equipped to receive the signal indicating a reapplication of power to a power supply within another power boundary and automatically reactivate the power supply.

Figure 2:
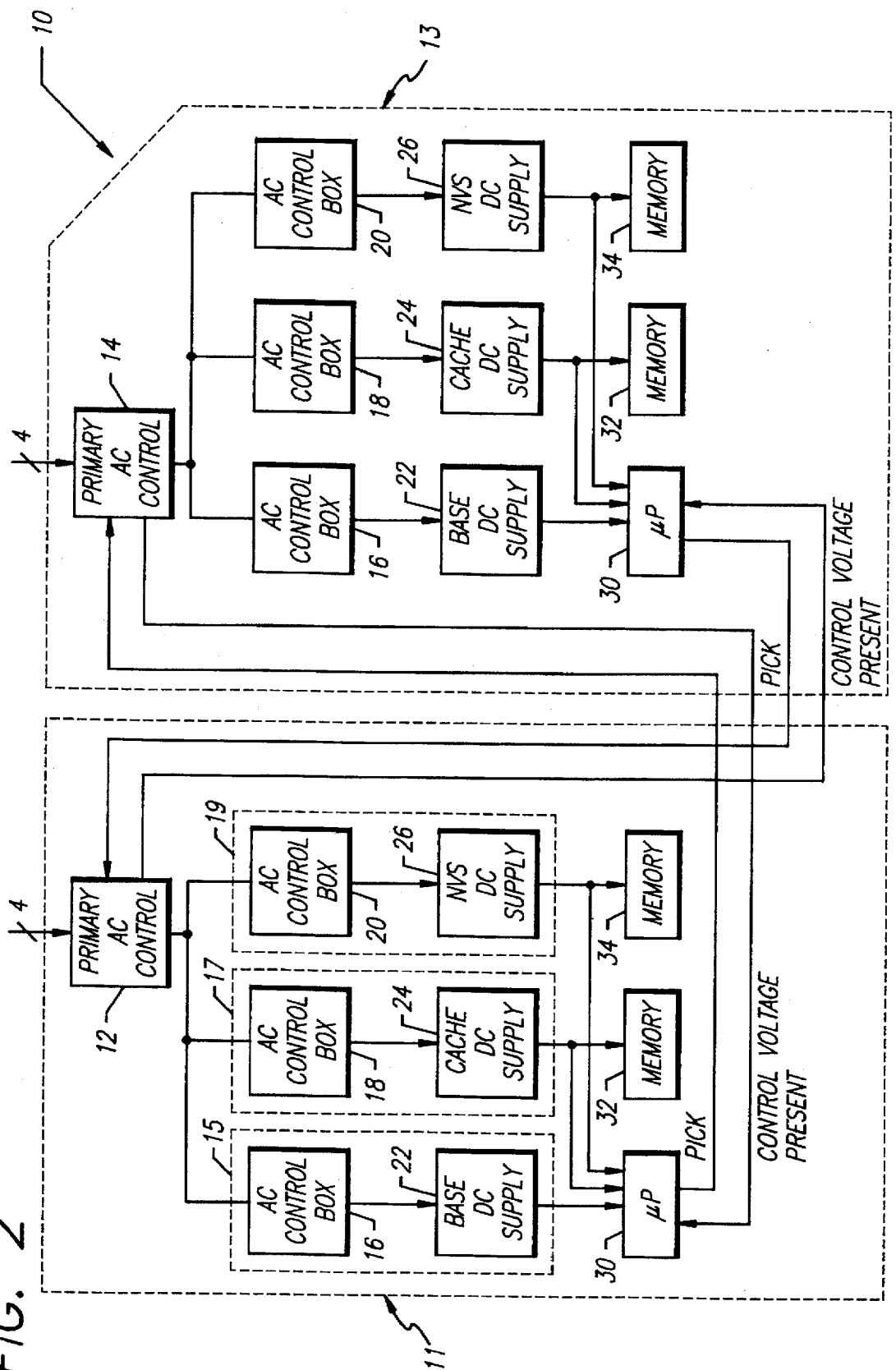
FIG. 2 is a block diagram of the improved power supply with automatic recovery system of the present invention.

FIG. 2 is a block diagram of the improved power supply with automatic recovery system of the present invention. The system 10 includes first and second identical primary AC control systems 12 and 14 disposed within first and second power boundaries 11 and 13, respectively.

Figure 3:
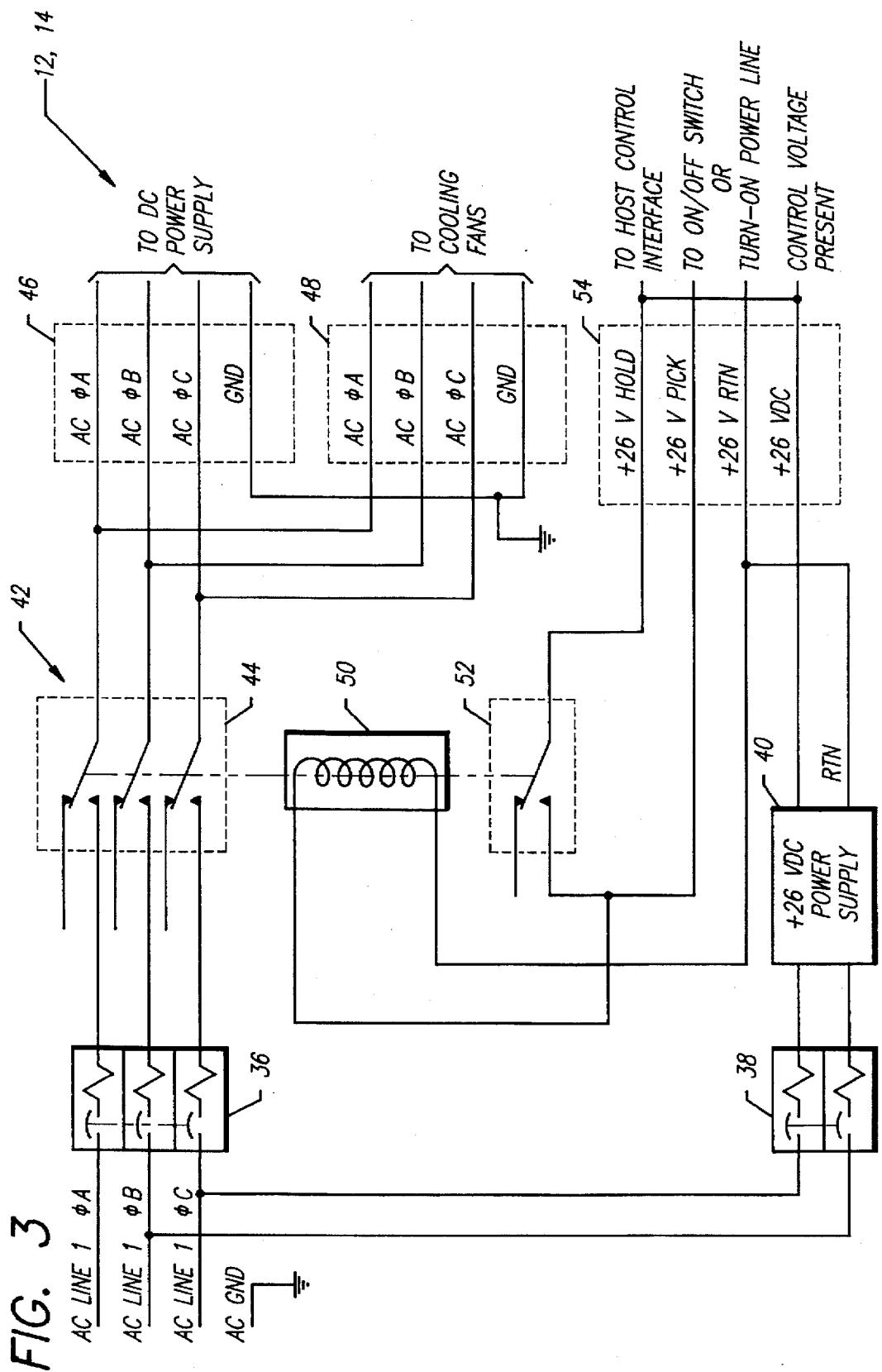
FIG. 3 is a simplified block diagram of the primary AC control system of the improved power supply with automatic recovery system of the present invention.

FIG. 3 is a simplified block diagram of the primary AC control systems 12 and 14. In accordance with the present teachings, the primary AC control system includes a first circuit breaker 36 which provides over-current protection for a first three phase power line (wall power). Two phases from the input three phase line are also input to a second circuit breaker 38. The second circuit breaker 38 provides over-current protection for a low voltage (e.g., 26 volt) power supply 40 of conventional design. In the illustrative embodiment, the low voltage power supply 40 provides a 26 volt DC output signal hereinafter designated as "control voltage present" whenever three-phase wall power is supplied.

Each primary control system 12, 14 further includes a relay 42 having a set of primary contacts 44 which transfer the three phase input power from the circuit breaker 36 to first and second output terminals 46 and 48, respectively on the application of power to the relay winding 50. A secondary contact 52 provides latch current for the relay winding 50 on the activation thereof. The first terminal block 46 provides power to a plurality of AC to DC converters as discussed more fully below. The second terminal block 48 provides power to cooling fans as is common in the art. A third terminal block 54 provides for communication of "HOLD", "RTN" (return), "PICK" (turn-on power supply) and "VDC" (control voltage present) signals.

The momentary application of power to the PICK line activates the winding and causes the primary and secondary contacts to close. In addition to transferring power from the circuit breaker 36 to the first and second terminal blocks 46 and 48, the closing of the secondary contact 52 applies a steady state latching current to the winding 50 from an external supply via a host computer interface and the HOLD line.

Returning to FIG. 2, within each power boundary 11, 13, the three phase outputs of each power system 12 and 14 are connected to a plurality of DC supplies 15, 17 and 19. The DC supplies 15, 17 and 19 include an AC control box 16, 18 and 20, respectively, which provides power conditioning and switching in a conventional manner to an associated AC to DC converter 22, 24 and 26, respectively. The base DC supply is an AC to DC converter which provides power to a microprocessor 30 within the respective power boundary. The cache DC supply 24 is an AC to DC converter which supplies power to a first (cache) memory 32 while the NVS (nonvolatile) supply 26 is an AC to DC converter which supplies power for a nonvolatile memory 34.

The microprocessor 30 includes registers (not shown) for the receipt of interrupts which indicate a power fault in the three DC supplies. In addition, the microprocessor 30 includes a register (not shown) which receives the control voltage present signal from the primary AC control system across the power boundary. For example, within the power boundary 11 of the first primary AC control system 12, the microprocessor 30 is connected to receive the control voltage present signal from the second primary AC control system 14. Similarly, each microprocessor 30 returns a PICK signal across the power boundary 11, 13 to the remote primary AC control system. As discussed above, after an interruption in the supply of power, the PICK signal from a microprocessor 30 in the unaffected power boundary (e.g., 11) commands the relay 50 of the primary AC control system in the affected power boundary (e.g., 13) to energize thereby reactivating the affected power supply after an interruption of power supplied thereby. (See FIG. 3).

Figure 4:
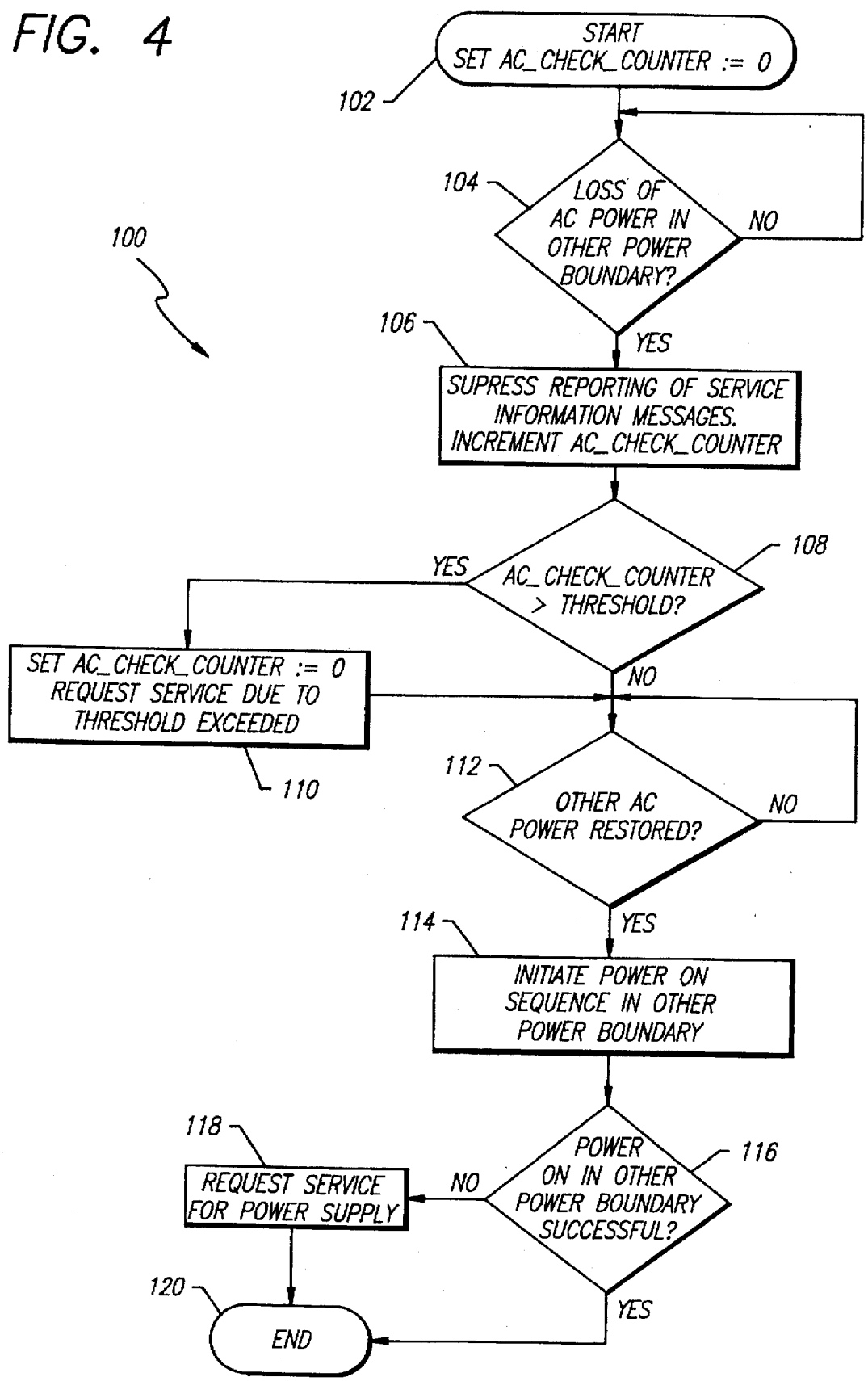
FIG. 4 is a flow diagram illustrating the operation of the improved power supply with automatic recovery system of the present invention.

FIG. 4 is a flow diagram illustrating the operation of the improved power supply with automatic recovery system of the present invention.

The illustrative method of the present invention begins at step 102 with the initialization of the threshold measurement. At this point, a microprocessor 30 within a boundary is set to monitor for power faults in the other power boundary (step 104). If a fault is detected, the system increments a check counter (step 106) and checks whether the threshold for these faults has been exceeded (step 108). If so, at step 110, the system resets the check counter and requests a service call. Now the microprocessor 30 no longer monitors for power faults (in the affected power supplies) and is set to monitor for power restoration ("Control Voltage Present" in FIG. 2 in the case that wall (utility) power was lost) at step 112. When power restoration is detected, power sequencing is initiated automatically (step 114). At step 116, the system checks to determine if the "power on" sequence was successfully initiated. If so, at step 120 service requests are canceled and the system returns to the starting point 102 in order to monitor for new power faults. If not, at step 118, a service call is made. Thus, the inventive method not only detects a loss of power to the second load, but also detects restoration of power to the input of a power supply across a power boundary. The invention provides a system by which an optimal response to a given power line disturbance (viz., whether or not to request a service call) is predetermined via software control.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,
What is claimed is:

1. An improved power supply comprising:
   first means for supplying power to a first load within a first power boundary;
   second means for supplying power to a second load within a second power boundary;
   third means located within said first power boundary for detecting an interruption in power supplied by said first means and for providing a first signal in response thereto;

fourth means connected within said second power boundary and responsive to said first signal for detecting a reapplication of power to said first means after an interruption in the supply of power by said first means and providing a second signal in response thereto;

fifth means located within said first power boundary for reactivating said first means in response to said second signal;

sixth means located within said second power boundary for detecting an interruption in power supplied by said second means and for providing a third signal in response thereto;

seventh means connected within said first power boundary and responsive to said third signal for detecting a reapplication of power to said second means after an interruption in the supply of power by said second means and providing a fourth signal in response thereto; and eighth means located within said second power boundary for reactivating said second means in response to said fourth signal.

2. An improved power supply comprising:

first means for supplying power to a first load within a first power boundary;

second means for supplying power to a second load within a second power boundary;

third means located within said first power boundary for detecting an interruption in power supplied by said first means and for providing a first signal in response thereto;

fourth means connected within said second power boundary and responsive to said first signal for detecting a reapplication of power to said first means after an interruption in the supply of power by said first means and providing a second signal in response thereto; and fifth means located within said first power boundary for reactivating said first means in response to said second signal.

3. A power supply comprising:

first control means for selectively applying power from a first source to a first power supply and for supplying a first signal on receipt of power from said first source;

second control means for selectively applying power from a second source to a second power supply and for supplying a second signal on receipt of power from said second source;

third control means powered by said first power supply for reactivating said second control means in response to said second signal after an interruption in the supply of power to said second control means; and fourth control means powered by said second power supply for reactivating said first control means in response to said first signal after an interruption in the supply of power to said first control means.

* * * * *